US012216469B2

(12) United States Patent
Wang et al.

(10) Patent No.: US 12,216,469 B2
(45) Date of Patent: Feb. 4, 2025

(54) AUTOMATIC SCANNING SYSTEM FOR TUNNEL WALLS CONSTRUCTED BY OPEN-TYPE TBM

(71) Applicant: BEIJING RESEARCH INSTITUTE OF URANIUM GEOLOGY, Beijing (CN)

(72) Inventors: Ju Wang, Beijing (CN); Hongsu Ma, Beijing (CN); Jian Liu, Beijing (CN); Liang Chen, Beijing (CN); Xingguang Zhao, Beijing (CN)

(73) Assignee: Beijing Research Institute of Uranium Geology (CN)

( * ) Notice: Subject to any disclaimer, the term of this patent is extended or adjusted under 35 U.S.C. 154(b) by 550 days.

(21) Appl. No.: 17/233,925

(22) Filed: Apr. 19, 2021

(65) Prior Publication Data

US 2022/0075377 A1 Mar. 10, 2022

(30) Foreign Application Priority Data

Sep. 4, 2020 (CN) .......................... 202010919500.0

(51) Int. Cl.
*G05D 1/00* (2024.01)
*E21D 9/00* (2006.01)
(Continued)

(52) U.S. Cl.
CPC ........... *G05D 1/0094* (2013.01); *E21D 9/003* (2013.01); *E21D 9/10* (2013.01); *G01S 7/4817* (2013.01);
(Continued)

(58) Field of Classification Search
CPC .... G05D 1/0094; G05D 1/0011; E21D 9/003; E21D 9/10; G01S 7/4817; G01S 17/42; G01S 17/89
See application file for complete search history.

(56) References Cited

U.S. PATENT DOCUMENTS 6,431,653 B1 * 8/2002 Kleuters ............... E21D 9/1093
299/33
9,043,069 B1 * 5/2015 Ferguson ................ G06T 7/215
701/23
(Continued)

FOREIGN PATENT DOCUMENTS

CN 104567708 B * 3/2018
CN 110657327 A * 1/2020 ............. F16M 11/18
(Continued)

OTHER PUBLICATIONS

"Wang, W. et. al.; Applications of terrestrial laser scanning for tunnels: a review; 2014; Journal of Traffic and Transportation Engineering (English Edition) 325-337" (Year: 2014).*
(Continued)

*Primary Examiner* — Elaine Gort
*Assistant Examiner* — Christopher R Cardimino
(74) *Attorney, Agent, or Firm* — Snell & Wilmer LLP

(57) ABSTRACT

An automatic scanning system for tunnel walls constructed by open-type TBM, to realize the automatic, accurate, rapid and omnidirectional scanning of tunnel wall. The system comprises a three-dimensional laser scanner, a walking unit, a circumferential track, several connecting rods and a remote-control unit; wherein the three-dimensional laser scanner is fixed on the walking unit. The walking unit is provided on the circumferential track and configured to walk on the circumferential track at a set speed and a set number of walking cycles according to a control instruction. The circumferential track is fixed on the main beam of open-type TBM through the connecting rods and located between the roof bolter and cylinder of gripper shoe. The remote-control unit is configured to issue the control instruction and control the three-dimensional laser scanner to scan the tunnel wall and transmit the scanning data using set scanning parameters.

10 Claims, 1 Drawing Sheet

(51) Int. Cl.
*E21D 9/10* (2006.01)
*G01S 7/481* (2006.01)
*G01S 17/42* (2006.01)
*G01S 17/89* (2020.01)

(52) U.S. Cl.
CPC .............. *G01S 17/42* (2013.01); *G01S 17/89* (2013.01); *G05D 1/0011* (2013.01)

(56) References Cited

U.S. PATENT DOCUMENTS

| | | | |
|---|---|---|---|
| 10,518,791 B2 * | 12/2019 | Singh | G06F 18/251 |
| 10,816,347 B2 * | 10/2020 | Wygant | G01C 21/383 |
| 2020/0072965 A1 * | 3/2020 | Cao | G05D 1/024 |

FOREIGN PATENT DOCUMENTS

| | | | | |
|---|---|---|---|---|
| CN | 110686616 A | * | 1/2020 | |
| CN | 110657327 B | * | 12/2020 | ............. F16M 11/18 |
| JP | 3570980 B2 | * | 9/2004 | |
| KR | 20110008402 A | * | 12/2011 | |
| KR | 20180113699 A | * | 10/2018 | |
| WO | WO-2018008808 A1 | * | 1/2018 | ........... E21D 11/105 |

OTHER PUBLICATIONS

"Cui, H et. al.; Shield subway tunnel deformation detection based on mobile laser scanning; 2019; Automation in Construction 106" (Year: 2019).*

* cited by examiner

AUTOMATIC SCANNING SYSTEM FOR TUNNEL WALLS CONSTRUCTED BY OPEN-TYPE TBM

CROSS-REFERENCE TO RELATED APPLICATIONS

This application claims the benefit and priority of Chinese Patent Application No. 202010919500.0, titled Automatic Scanning System for Tunnel Walls Constructed by Open-Type TBM, filed on Sep. 4, 2020, the entire contents of which is hereby incorporated by reference herein in its entirety.

TECHNICAL FIELD

The present disclosure relates to the field of geological logging of tunnel surrounding rocks, in particular to an automatic scanning system for tunnel walls constructed by open-type TBM.

BACKGROUND

For tunnel construction engineering, geological information of surrounding rocks is an important basis for guiding tunnel construction and optimizing engineering design. Since the Tunnel Boring Machine (TBM) has a massive set of complex equipment and occupies most of the space behind the tunnel face, the geological logging of surrounding rocks is limited. At present, manual geological logging is mainly used in TBM construction projects, which is low in accuracy, time-consuming and difficult to obtain geological information omnidirectionally in 360 degrees. Therefore, how to collect geological information of surrounding rocks automatically, accurately, rapidly and omnidirectionally is a technical problem to be solved in the technical field of geological logging of surrounding rocks of TBM construction tunnels. In view of the above problems, an automatic scanning system for tunnel walls suitable for open-type TBM construction, which can accurately, rapidly and omnidirectionally obtain geological information of surrounding rocks of tunnel walls, is needed.

SUMMARY

The purpose of the present disclosure is to provide an automatic scanning system for tunnel walls constructed by open-type TBM, which can realize automatic, accurate, rapid and omnidirectional collection of geological information of the tunnel wall under TBM construction.

To achieve the above purpose, the present disclosure provides the following scheme:

An automatic scanning system for tunnel walls constructed by open-type TBM, comprising a three-dimensional laser scanner, a walking unit, a circumferential track, several connecting rods and a remote-control unit;

wherein the three-dimensional laser scanner is fixed on the walking unit; the three-dimensional laser scanner is configured to three-dimensionally scan geological information of the tunnel wall;

the walking unit is provided on the circumferential track; the walking unit is configured to walk or stop walking on the circumferential track at a set speed and a set number of walking cycles according to a control instruction issued by the remote-control unit or a control module in the walking unit; the control instruction comprises a walking instruction or a stopping walking instruction;

the circumferential track is fixed on the main beam of open-type TBM through the connecting rods and located between the roof bolter and cylinder of gripper shoe;

the remote-control unit is connected with the three-dimensional laser scanner and the walking unit, respectively; the remote-control unit is configured to issue the control instruction to the walking unit to control the walking unit to start walking or stop walking at a set speed and a set number of walking cycles, and control the three-dimensional laser scanner to start scanning or stop scanning and wirelessly transmit the scanning data using set scanning parameters according to the control instruction.

Preferably, the walking unit comprises a walking frame, a fixing component, a control module, a power supply device and a rubber wheel component;

the fixing component is provided on the upper part of the walking frame and the fixing component is configured to fix the three-dimensional laser scanner;

the control module is connected with the power supply device and the rubber wheel component, respectively; the control module is configured to control the switching on/off of the power supply device; the control module is further configured to control the rubber wheel component to walk on the circumferential track at a set speed and a set number of walking cycles;

the rubber wheel component is provided on the lower part of the walking frame, and the rubber wheel component is connected with the power supply device and the circumferential track;

the control module and the power supply device are both provided inside the walking frame.

Preferably, the fixing component fixes the three-dimensional laser scanner in the form of bolts or buckles.

Preferably, the power supply device is a lithium battery.

Preferably, the structure of the circumferential track is of a segmented splicing type or of an integral ring type.

Preferably, when the structure of the circumferential track is of a segmented splicing type, the connecting rods are telescopic connecting rods.

Preferably, the circumferential track is made of lightweight and high-strength metal material.

Preferably, there are a plurality of connecting rods.

Preferably, the data transmission mode of the three-dimensional laser scanner is wired transmission or wireless transmission.

Preferably, the control modes of the three-dimensional laser scanner and the walking unit comprise manual control or remote control by the remote-control unit.

According to the specific embodiment according to the present disclosure, the present disclosure discloses the following technical effects.

According to the present disclosure of automatic scanning system for tunnel walls constructed by open-type TBM, a three-dimensional laser scanner walks for a circle on a circumferential track by means of a walking unit to complete automatic and omnidirectional scanning of surrounding tunnel walls. Automatic, rapid, timely and omnidirectional scanning of geological conditions of surrounding rocks of tunnel walls for TBM construction can be realized. The obtained information has high accuracy. At the same time, fewer operators are needed and high safety is achieved.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION

The technical scheme in the embodiments of the present disclosure will be described clearly and completely with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide an automatic scanning system for tunnel walls constructed by open-type TBM, which can realize automatic, accurate, rapid and omnidirectional collection of geological information of a tunnel wall for TBM construction.

In order to make the above objects, features and advantages of the present disclosure more obvious and understandable, the present disclosure will be further explained in detail with reference to the drawings and specific embodiments.

Figure 1:
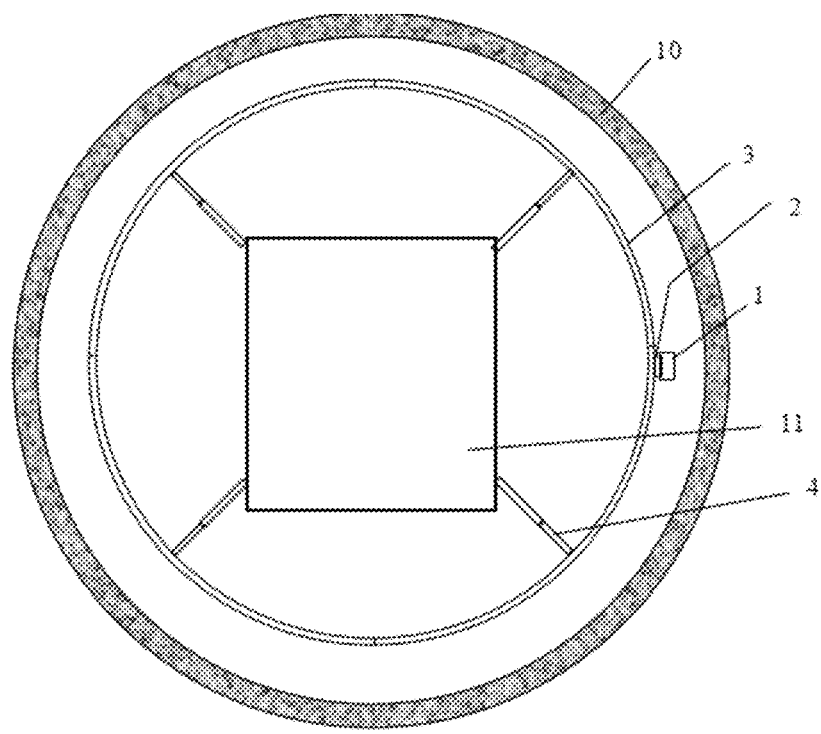
FIG. 1 is a structural schematic diagram of an automatic scanning system for tunnel walls constructed by open-type TBM according to the present disclosure.

FIG. 1 is a structural schematic diagram of an automatic scanning system for open TBM construction according to the present disclosure. As shown in FIG. 1, the automatic scanning system for tunnel walls constructed by open-type TBM according to the present disclosure comprises a three-dimensional laser scanner 1, a walking unit 2, a circumferential track 3, four connecting rods 4 and a remote-control unit.

The three-dimensional laser scanner 1 is fixed on the walking unit 2; the three-dimensional laser scanner 1 is configured to three-dimensionally scan geological information of the tunnel wall 10. The control modes of the three-dimensional laser scanner and the walking unit comprise manual control or remote control by the remote-control unit.

Further, the three-dimensional laser scanner 1 stores and transmits the geological information of the scanned tunnel wall 10, and the transmission modes can comprise wired transmission and wireless transmission.

The walking unit 2 is provided on the circumferential track 3; the walking unit 2 is configured to walk or stop walking on the circumferential track 3 at a set speed and a set number of walking cycles according to a control instruction issued by the remote-control unit or the control module 7 in the walking unit 2; the control instruction comprises a walking instruction or a stopping walking instruction. That is, the three-dimensional laser scanner 1 walks for a circle on a circumferential track 3 by means of a walking unit 2 to complete automatic and omnidirectional scanning of surrounding tunnel walls 10.

In order to avoid affecting the implementation of the temporary support, and to obtain the geological information of the tunnel wall 10 as soon as possible, the circumferential track 3 is fixed on the main beam of open-type TBM 11 through the connecting rods 4 and located between the roof bolter and cylinder of gripper shoe.

The remote-control unit is connected with the three-dimensional laser scanner 1 and the walking unit 2, respectively. The remote-control unit is configured to issue the control instruction to the walking unit 2 to control the walking unit 2 to start walking or stop walking at a set speed and a set number of walking cycles, and control the three-dimensional laser scanner 1 to start scanning or stop scanning and wirelessly transmit the scanning data using set scanning parameters according to the control instruction.

Figure 2:
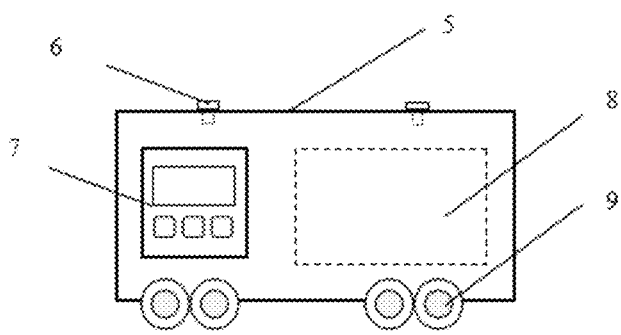
FIG. 2 is a schematic structural diagram of a walking unit according to the present disclosure.

FIG. 2 is a structural schematic diagram of a walking unit 2 according to the present disclosure. As shown in FIG. 2, the walking unit 2 comprises a walking frame 5, a fixing component 6, a control module 7, a power supply device 8 and a rubber wheel component 9.

The fixing component 6 is provided on the upper part of the walking frame 5 and the fixing component 6 is configured to fix the three-dimensional laser scanner 1.

The control module 7 is connected with the power supply device 8 and the rubber wheel component 9, respectively; the control module 7 is configured to control the switching on/off of the power supply device 8; the control module 7 is further configured to control the rubber wheel component 9 to walk on the circumferential track 3 at a set speed and a set number of walking cycles. The control module 7 comprises a control panel for manual operation or can be controlled by a remote controller.

The rubber wheel component 9 is provided on the lower part of the walking frame 5, and the rubber wheel component 9 is connected with the power supply device 8 and the circumferential track 3.

The control module 7 and the power supply device 8 are both provided inside the walking frame 5.

In order to rapidly fix and disassemble the three-dimensional laser scanner 1 on the walking unit 2, the fixing component 6 fixes the three-dimensional laser scanner 1 in the form of bolts or buckles.

The power supply device 8 is a lithium battery.

The structure of the circumferential track 3 is of a segmented splicing type or of an integral ring type. By designing multiple sets of segmented splicing tracks, the size requirements of circumferential track 3 with different ring diameters can be met.

The ring diameter of the circumferential track 3 is determined according to the tunnel diameter, the working space and the single scanning range. By adjusting the distance between the circumferential track 3 and the tunnel wall 10, that is, adjusting the ring diameter D of the circumferential track 3, the maximum width L for a single scanning of the three-dimensional laser scanner 1 in the axial direction of the tunnel can be controlled. The maximum width L can be set as one-stroke length or multiple-stroke lengths, but not less than one stroke. In the same tunnel, the smaller the ring diameter D is, the larger the maximum width L of a single scanning is. The ring diameter can be adjusted by selecting different models of segmented splicing circumferential tracks 3.

The cross section of the circumferential track 3 is of a slot type, which is convenient for fixing and walking of the rub wheel component 9 on the circumferential.

When the structure of the circumferential track 3 is of a segmented splicing type, the connecting rods 4 are telescopic connecting rods 4. The telescopic connecting rods 4 are configured to adjust the length and adapt to the adjustment of the ring diameter of the segmented-splicing circumferential track 3.

The circumferential track 3 is made of lightweight and high-strength metal material.

There are a plurality of connecting rods 4, generally 3-5 connecting rods. The structural forms of a single rod comprise an integral form or a telescopic form.

According to the present disclosure, the using method and working principle of the automatic scanning system for tunnel walls 10 constructed by open-type TBM are as follows.

The present disclosure is used when the TBM cutter head stops tunneling, so as to avoid the influence of TBM vibration on the accuracy of scanning result and the damage to the three-dimensional laser scanner 1 during TBM tunneling. The three-dimensional laser scanner 1 is installed on the walking unit 2. The three-dimensional laser scanner 1 starts. The scanning parameters are set and scanning starts.

The walking speed and number of walking cycles (walking for one cycle in this example) of the walking unit 2 are set through the control module 7 or the remote-control unit, and the walking unit 2 starts.

The walking unit 2 walks around the circumferential track 3 for one cycle, and the three-dimensional laser scanner 1 omnidirectionally scans the tunnel wall 10 in the scanning range, thus obtaining the geological information of the segment of surrounding rocks.

The walking unit automatically stops walking and stops scanning of the three-dimensional laser scanner 1. The three-dimensional laser scanner 1 is removed from the walking unit 2.

After the TBM tunnels the next stroke or multiple strokes, the three-dimensional laser scanner 1 is installed again for automatic scanning. The above steps are repeated.

According to the automatic scanning system for tunnel walls constructed by open-type TBM, a vibration damping device is added after the later optimization design, so that the three-dimensional laser scanner 1 can be fixed on the TBM during the whole construction process without disassembling and assembling after each scanning. In this way, the whole process of remote control can be realized by the remote-control unit, comprising controlling the walking unit 2 to walk and stop walking at a set speed and a set number of walking cycles, and controlling the three-dimensional laser scanner 1 to scan or stop scanning and wirelessly transmit the scanning data using set scanning parameters.

In this specification, each embodiment is described in a progressive manner. Each embodiment focuses on the differences from other embodiments. It is sufficient to refer to the same and similar parts of each embodiment.

In the present disclosure, a specific example is applied to illustrate the principle and implementation of the present disclosure. The explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. An automatic scanning system for tunnel walls constructed by open-type TBM, comprising:
    a three-dimensional laser scanner, a circumferential walking unit, a circumferential track, a connecting rod and a remote-control unit;
    wherein the three-dimensional laser scanner is fixed on the circumferential walking unit, and the three-dimensional laser scanner is configured to three-dimensionally scan geological information of the tunnel wall;
    the circumferential walking unit is provided on the circumferential track, and the circumferential walking unit is configured to walk or stop walking on the circumferential track at a set speed and a set number of walking cycles according to a control instruction issued by the remote-control unit or a control module in the circumferential walking unit, the control instruction comprises a walking instruction or a stopping walking instruction;
    the circumferential track is fixed on the main beam of open-type TBM through the connecting rod and located between the roof bolter and cylinder of gripper shoe;
    the remote-control unit is connected with the three-dimensional laser scanner and the circumferential walking unit, respectively, the remote-control unit is configured to issue the control instruction to the circumferential walking unit to control the circumferential walking unit to start walking or stop walking at a set speed and a set number of walking cycles, and control the three-dimensional laser scanner to start scanning or stop scanning and wirelessly transmit the scanning data using set scanning parameters according to the control instruction; and
    wherein a ring diameter of the circumferential track is determined according to tunnel diameter, working space and single scanning range, and a maximum width of the single scanning range for the three-dimensional laser scanner is determined by adjusting the ring diameter of the circumferential track, and wherein the maximum width is set as one or more stroke lengths.

2. The automatic scanning system for tunnel walls constructed by open-type TBM according to claim 1, wherein the circumferential walking unit comprises a walking frame, a fixing component, a control module, a power supply device and a rubber wheel component;
    the fixing component is provided on the upper part of the walking frame and the fixing component is configured to fix the three-dimensional laser scanner;
    the control module is connected with the power supply device and the rubber wheel component, respectively, the control module is configured to control the switching on/off of the power supply device, the control module is further configured to control the rubber wheel component to walk on the circumferential track at a set speed and a set number of walking cycles;
    the rubber wheel component is provided on the lower part of the walking frame, and the rubber wheel component is connected with the power supply device and the circumferential track;
    the control module and the power supply device are both provided inside the walking frame.

3. The automatic scanning system for tunnel walls constructed by open-type TBM according to claim 2, wherein the fixing component fixes the three-dimensional laser scanner in the form of bolts or buckles.

4. The automatic scanning system for tunnel walls constructed by open-type TBM according to claim 2, wherein the power supply device is a lithium battery.

5. The automatic scanning system for tunnel walls constructed by open-type TBM according to claim 1, wherein the structure of the circumferential track is of a segmented splicing type or of an integral ring type.

6. The automatic scanning system for tunnel walls constructed by open-type TBM according to claim 5, wherein when the structure of the circumferential track is of a segmented splicing type, the connecting rod is a telescopic connecting rod.

7. The automatic scanning system for tunnel walls constructed by open-type TBM according to claim 1, wherein the circumferential track is made of a lightweight and high-strength metal material.

8. The automatic scanning system for tunnel walls constructed by open-type TBM according to claim 1, wherein the connecting rod is a plurality of connecting rods.

9. The automatic scanning system for tunnel walls constructed by open-type TBM according to claim 1, wherein the data transmission mode of the three-dimensional laser scanner is wired transmission or wireless transmission.

10. The automatic scanning system for tunnel walls constructed by open-type TBM according to claim 1, wherein the control modes of the three-dimensional laser scanner and the circumferential walking unit comprise manual control or remote control by the remote-control unit.

* * * * *